US012567293B2

(12) United States Patent
Abdoulkarim

(10) Patent No.: US 12,567,293 B2
(45) Date of Patent: Mar. 3, 2026

(54) BODYBUILDER MODULE FOR DATA LOGGING AND A DATA LOGGING METHOD

(71) Applicant: Volvo Truck Corporation, Gothenburg (SE)

(72) Inventor: Aboubacar Abdoulkarim, Lyons (FR)

(73) Assignee: Volvo Truck Corporation, Gothenburg (SE)

( * ) Notice: Subject to any disclaimer, the term of this patent is extended or adjusted under 35 U.S.C. 154(b) by 72 days.

(21) Appl. No.: 18/442,332

(22) Filed: Feb. 15, 2024

(65) Prior Publication Data

US 2024/0290147 A1 Aug. 29, 2024

(30) Foreign Application Priority Data

Feb. 27, 2023 (EP) .................................... 23158829

(51) Int. Cl.
*G07C 5/08* (2006.01)
*G07C 5/00* (2006.01)

(52) U.S. Cl.
CPC ............. *G07C 5/085* (2013.01); *G07C 5/008* (2013.01)

(58) Field of Classification Search
CPC ....... G07C 5/085; G07C 5/008; G07C 5/0841
USPC ........................................................ 701/33.4
See application file for complete search history.

(56) References Cited

U.S. PATENT DOCUMENTS 6,496,766 B1 * 12/2002 Bernold ................ B66C 15/065 340/685
10,909,782 B1 * 2/2021 Natanzon ............. G07C 5/0841
11,782,978 B1 * 10/2023 Zakian .................. G06F 16/172 707/661
2010/0076648 A1 * 3/2010 Molina .................. B60R 25/00 700/87
2011/0257810 A1 * 10/2011 Leger .................... G06F 21/629 701/1

(Continued)

FOREIGN PATENT DOCUMENTS

DE 102008047561 A1 4/2010
WO 17129963 A1 8/2017

OTHER PUBLICATIONS

European Search Report for European Patent Application No. 23158829.4, completed Aug. 3, 2023, 3 pages.

*Primary Examiner* — Tyler D Paige
(74) *Attorney, Agent, or Firm* — Withrow & Terranova, PLLC

(57) ABSTRACT

A bodybuilder module for data logging, the bodybuilder module comprising an electronic control unit controlling a ring buffer memory unit and a recording unit, the bodybuilder module being operationally connected to a plurality of sensors installed on a bodywork of a vehicle, and to a plurality of vehicle integrated sensors installed on the vehicle, the electronic control unit being further configured to set a first time duration; select at least one sensor signal, and continuously record the sensor signal in the ring buffer memory unit during the first time duration; select at least one vehicle integrated sensor signal and continuously record samples in the ring buffer memory unit during the first time duration; receive as input a triggering signal related to an incident occurrence, so that a moment of triggering is defined; and at the moment of triggering, transfer a content of the ring buffer memory into the recording unit.

13 Claims, 3 Drawing Sheets

(56) References Cited

U.S. PATENT DOCUMENTS

| | | | | |
|---|---|---|---|---|
| 2017/0053554 | A1* | 2/2017 | Nalepka | G09B 5/02 |
| 2019/0302766 | A1* | 10/2019 | Mondello | G07C 5/085 |
| 2020/0192366 | A1* | 6/2020 | Levinson | G01S 15/931 |
| 2020/0326958 | A1* | 10/2020 | Blumenthal | G06F 8/65 |
| 2020/0342691 | A1* | 10/2020 | Saers | G06F 9/44505 |
| 2021/0074088 | A1* | 3/2021 | McQuade | G07C 5/0816 |
| 2022/0048432 | A1* | 2/2022 | Switalski | G08G 1/205 |

* cited by examiner

[Fig. 1]
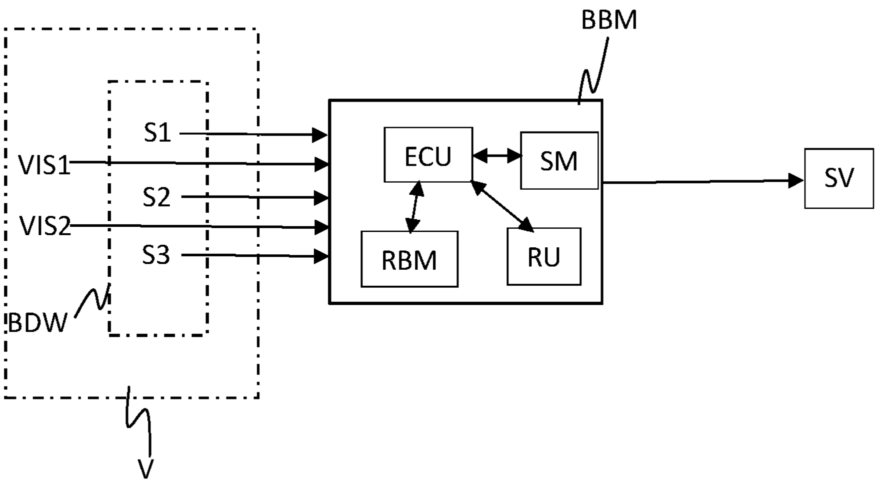

[Fig. 2]
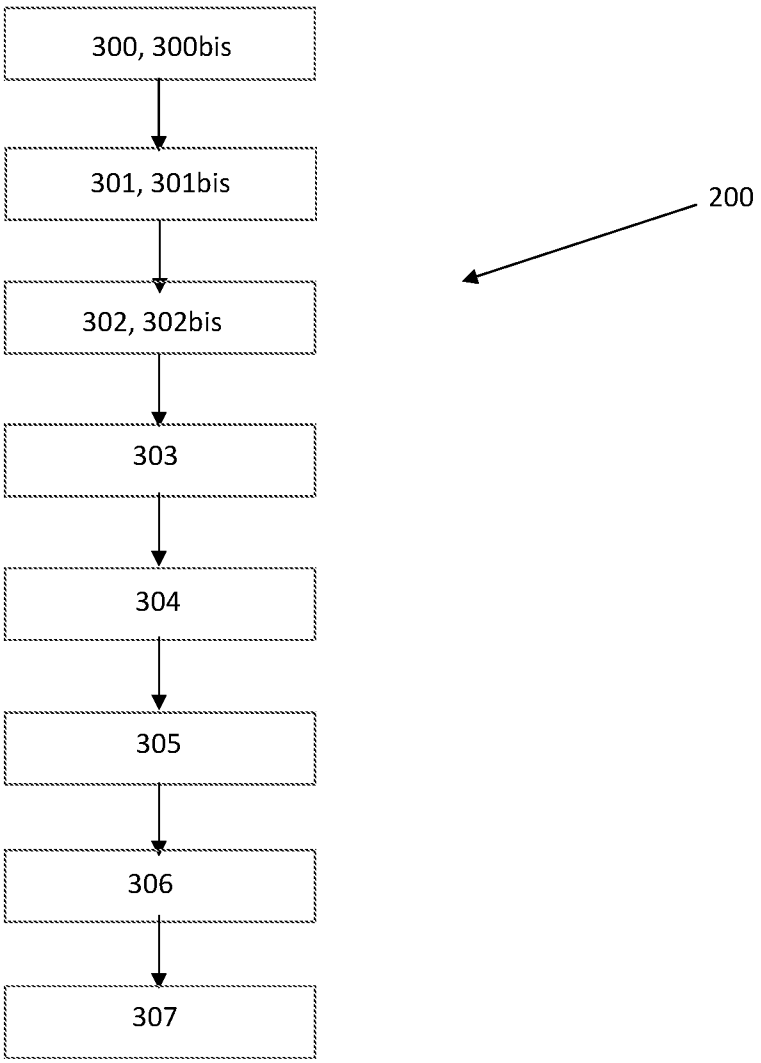

[Fig. 3]
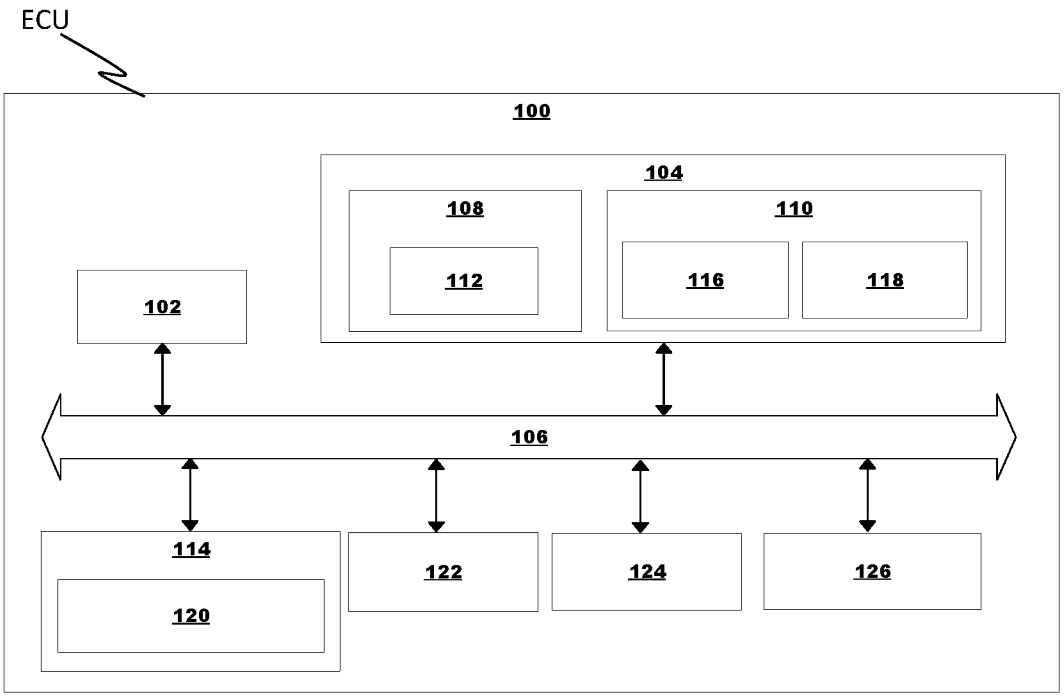

BODYBUILDER MODULE FOR DATA LOGGING AND A DATA LOGGING METHOD

PRIORITY APPLICATIONS

The present application claims priority to European Patent Application No. 23158829.4, filed on Feb. 27, 2023, and entitled "BODYBUILDER MODULE FOR DATA LOGGING AND A DATA LOGGING METHOD," which is incorporated herein by reference in its entirety.

TECHNICAL FIELD

The disclosure relates generally to data logging. In particular aspects, the disclosure relates to data logging on vehicle and in cloud of safety related information. The disclosure can be applied in heavy-duty vehicles, such as trucks, buses, and construction equipment. Although the disclosure may be described with respect to a particular vehicle, the disclosure is not restricted to any particular vehicle.

BACKGROUND

Bodybuilders usually install an emergency button that can be pressed in order to stop a bodybuilder equipment on the bodywork in case of danger. This emergency button can be used when the equipment is behaving in a dangerous way, or when it is used in an unsafe way. Existing data logging solutions are only relative to a vehicle crash or a shock and are not adapted to the bodybuilder's needs, where it is important to know the status of the equipment and its environment before and after the emergency button is pressed.

SUMMARY

According to a first aspect of the disclosure, a bodybuilder module for data logging is provided, the bodybuilder module comprising an electronic control unit, a ring buffer memory unit and a recording unit, the electronic control unit being configured to control the ring buffer memory unit and the recording unit, the bodybuilder module being configured to be operationally connected to a plurality of sensors installed on a bodywork of a vehicle, the bodybuilder module being further configured to be operationally connected to a plurality of vehicle integrated sensors installed on the vehicle, the electronic control unit of the bodybuilder module being further configured to:

set a first time duration;

select at least one sensor signal generated by at least one sensor among the plurality of sensors, and continuously record the at least one sensor signal in the ring buffer memory unit during the first time duration, so that when the ring buffer memory is full new samples from the at least one sensor signal replaces oldest samples from the at least one sensor signal;

select at least one vehicle integrated sensor signal generated by at least one vehicle integrated sensor among the plurality of vehicle integrated sensors, and continuously record samples of the at least one vehicle integrated sensor signal in the ring buffer memory unit during the first time duration, so that when the ring buffer memory is full, new samples from the at least one vehicle integrated sensor signal replaces oldest samples from the at least one vehicle integrated sensor signal;

receive as input a triggering signal related to an incident occurrence, so that a moment of triggering is defined by comparing a triggering signal value at the moment of triggering and a triggering signal threshold;

at the moment of triggering, transfer a content of the ring buffer memory into the recording unit.

The first aspect of the disclosure may seek to log data related to the incident occurrence for investigating the reasons and possible consequences of the incident occurrence. A technical benefit may include enabling the bodybuilder to select the data to be logged among the data from the plurality of sensors he installs on his bodywork and combine this with data from the plurality of vehicle integrated sensors installed on the vehicle in order to get the data record closest to his particular needs.

In some examples, the electronic control unit ECU of the bodybuilder module BBM is further configured to:

set a second time duration;

starting at the moment of triggering and during the second time duration, further record in the recording unit other new samples from the at least one sensor signal and from the at least one vehicle integrated sensor signal, at an end of the second time duration, starting at the moment of triggering, save in a saving memory of the bodybuilder at least one of the samples recorded in the recording unit.

A technical benefit may include logging data not only before the incident occurrence, but also after the incident occurrence, for investigating the reasons and possible consequences of the incident occurrence, and enabling the bodybuilder to investigate more precisely and completely the reasons and possible consequences of the incident occurrence.

In some examples, the samples recorded are time-stamped. A technical benefit may include enabling the bodybuilder to investigate more precisely and completely the reasons and possible consequences of the incident occurrence.

In some examples, the bodybuilder module is further configured to process the samples saved to determine the causes and consequences of the incident occurrence. A technical benefit may include enabling the bodybuilder to investigate locally the reasons and possible consequences of the incident occurrence.

In some examples, the triggering signal is generated by one of an emergency stop button, a triggering sensor selected among the plurality of sensors, a triggering vehicle integrated sensor signal selected among the plurality of vehicle integrated sensors. A technical benefit may include enabling the bodybuilder to investigate other incident occurrences.

In some examples, the samples saved are transferred to a server. A technical benefit may include enabling the bodybuilder to investigate more efficiently incident occurrences with more computing resources.

In some examples, samples from the at least one sensor signal, respectively from the at least one vehicle integrated sensor signal, are recorded at a first sampling rate, respectively at a second sampling rate, the first sampling rate, respectively the second sampling rate, being one of 0.5 sec, 1 sec, 2 sec, 5 sec, 10 sec, 20 sec, 30 sec, 60 sec. A technical benefit may include enabling the bodybuilder to investigate more efficiently incident occurrences.

In some examples, the first time duration, respectively the second time duration, are determined so that a first number of samples, respectively a second number of samples, from the at least one sensor signal and from the at least one vehicle integrated sensor signal are recorded at the sampling rate during the first time duration, respectively during the second time duration. A technical benefit may include enabling the bodybuilder to investigate more efficiently incident occurrences.

In some examples, the first number of samples, respectively the second number of samples, is comprised between 10 and 30, including 10 and 30. A technical benefit may include enabling the bodybuilder to investigate more efficiently incident occurrences.

In some examples, the first number of samples, respectively the second number of samples, is equal to 20. A technical benefit may include enabling the bodybuilder to investigate more efficiently incident occurrences.

In some examples, the plurality of sensors comprise at least one of a temperature sensor for a hydraulic pump, a pressure sensor for a mechanical equipment, an engine speed of an external equipment, a status of an external equipment. A technical benefit may include enabling the bodybuilder to investigate more specifically incident occurrences.

In some examples, the plurality of vehicle integrated sensors comprise at least one of a vehicle positioning sensor, a vehicle engine speed sensor, a vehicle speed sensor. A technical benefit may include enabling the bodybuilder to investigate more specifically incident occurrences.

According to a second aspect of the disclosure, a vehicle comprising the bodybuilder module according to any of examples described herein is provided. The second aspect of the disclosure may seek to help the bodybuilder to investigate incident occurrences related to the bodywork of the vehicle.

According to a third aspect of the disclosure, a method is provided for logging data on a bodybuilder equipment, using a bodybuilder module comprising an electronic control unit, a ring buffer memory unit and a recording unit, the electronic control unit being configured to control the ring buffer memory unit and the recording unit, the bodybuilder module being configured to be operationally connected to a plurality of sensors installed on a bodywork of a vehicle, the bodybuilder module being further configured to be operationally connected to a plurality of vehicle integrated sensors installed on the vehicle, the method implemented by the electronic control unit comprises:

set a first time duration;

select at least one sensor signal generated by at least one sensor among the plurality of sensors;

continuously record samples of the at least one sensor signal in the ring buffer memory unit during the first time duration, so that when the ring buffer memory is full, new samples from the at least one sensor signal replaces oldest samples from the at least one sensor signal;

select at least one vehicle integrated sensor signal generated by at least one vehicle integrated sensor among the plurality of vehicle integrated sensors;

continuously record samples of the at least one vehicle integrated sensor signal in the ring buffer memory unit during the first time duration, so that when the ring buffer memory is full, new samples from the at least one vehicle integrated sensor signal replaces oldest samples from the at least one vehicle integrated sensor signal;

determine a triggering signal and a triggering signal threshold related to an incident occurrence, so that a moment of triggering is defined by comparing a triggering signal value at the moment of triggering and the triggering signal threshold, at the moment of triggering, transfer a content of the ring buffer memory into the recording unit.

The third aspect of the disclosure may seek to log data related to the incident occurrence for investigating the reasons and possible consequences of the incident occurrence. A technical benefit may include enabling the bodybuilder to select the data to be logged among the data from the plurality of sensors he installs on his bodywork and combine this with data from the plurality of vehicle integrated sensors installed on the vehicle in order to get the data record closest to his particular needs.

In some examples, the method further comprises:

set a second time duration;

starting at the moment of triggering and during the second time duration, further record in the record unit other new samples from the at least one sensor signal and from the at least one vehicle integrated sensor signal, at an end of the second time duration, starting at the moment of triggering, save in a saving memory of the bodybuilder module at least one of the samples recorded in the recording unit.

A technical benefit may include logging data not only before the incident occurrence, but also after the incident occurrence, for investigating the reasons and possible consequences of the incident occurrence, and enabling the bodybuilder to investigate more precisely and completely the reasons and possible consequences of the incident occurrence.

In some examples, the method further comprises processing by the bodybuilder module the samples saved to determine the causes and consequences of the incident occurrence. A technical benefit may include enabling the bodybuilder to investigate locally the reasons and possible consequences of the incident occurrence.

In some examples, the samples recorded are time-stamped. A technical benefit may include enabling the bodybuilder to investigate more precisely and completely the reasons and possible consequences of the incident occurrence.

In some examples, the triggering signal is generated by one of an emergency stop button, a triggering sensor selected among the plurality of sensors, a triggering vehicle integrated sensor signal selected among the plurality of vehicle integrated sensors. A technical benefit may include enabling the bodybuilder to investigate other incident occurrences.

In some examples, the samples saved are transferred to a server. A technical benefit may include enabling the bodybuilder to investigate more efficiently incident occurrences with more computing resources.

In some examples, samples from the at least one sensor signal, respectively from the at least one vehicle integrated sensor signal, are recorded at a first sampling rate, respectively at a second sampling rate, the first sampling rate, respectively the second sampling rate, being one of 0.5 sec, 1 sec, 2 sec, 5 sec, 10 sec, 20 sec, 30 sec, 60 sec. A technical benefit may include enabling the bodybuilder to investigate more efficiently incident occurrences.

In some examples, the first time duration, respectively the second time duration, are determined so that a first number of samples, respectively a second number of samples, from the at least one sensor signal and from the at least one vehicle integrated sensor signal are recorded at the sampling rate during the first time duration, respectively during the second time duration. A technical benefit may include enabling the bodybuilder to investigate more efficiently incident occurrences.

In some examples, the first number of samples, respectively the second number of samples, is comprised between 10 and 30, including 10 and 30. A technical benefit may include enabling the bodybuilder to investigate more efficiently incident occurrences.

In some examples, the first number of samples, respectively the second number of samples, is equal to 20. A technical benefit may include enabling the bodybuilder to investigate more efficiently incident occurrences.

In some examples, the plurality of sensors comprise at least one of a temperature sensor for a hydraulic pump, a pressure sensor for a mechanical equipment, an engine speed of an external equipment, a status of an external equipment. A technical benefit may include enabling the bodybuilder to investigate more specifically incident occurrences.

In some examples, the plurality of vehicle integrated sensors comprise at least one of a vehicle positioning sensor, a vehicle engine speed sensor, a vehicle speed sensor. A technical benefit may include enabling the bodybuilder to investigate more specifically incident occurrences.

According to a fourth aspect of the disclosure, a computer program product is provided, comprising program code for performing the method of any of exemplary implementations, when executed by a processor device of an electronic control unit of a bodybuilder module, the electronic control unit controlling a ring buffer memory unit and a recording unit.

According to a fifth aspect of the disclosure, a non-transitory computer-readable storage medium is provided comprising instructions, which when executed by a processor device of an electronic control unit of a bodybuilder module, the electronic control unit controlling a ring buffer memory unit and a recording unit, cause the electronic control unit to perform the method of any of any of exemplary implementations.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

FIG. 1 is an exemplary bodybuilder module according to one example.

FIG. 2 is an exemplary flowchart illustrating the method implemented by the electronic control unit of the bodybuilder module according to one example.

FIG. 3 is a schematic diagram of an exemplary electronic control unit for implementing examples disclosed herein, according to one example.

DETAILED DESCRIPTION

Aspects set forth below represent the necessary information to enable those skilled in the art to practice the disclosure.

Existing data logging solutions are only relative to a vehicle crash or a shock and are not adapted to the bodybuilder's needs, where it is important to know the status of the equipment and its environment before and after an incident occurrence.

FIG. 1 is an exemplary bodybuilder module BBM for data logging, according to one example. The bodybuilder module BBM for data logging comprises an electronic control unit ECU, a ring buffer memory unit RBM and a recording unit RU, the electronic control unit ECU being configured to control the ring buffer memory unit RBM and the recording unit RU. The bodybuilder module BBM is operationally connected to a plurality of sensors S1, S2, S3 installed on a bodywork BDW of a vehicle V. The bodybuilder module BBM is also operationally connected to a plurality of vehicle integrated sensors VIS1, VIS2 installed on the vehicle V.

The electronic control unit ECU of the bodybuilder module BBM is configurable at any time. This means that different features/parameters of the bodybuilder module BBM have to be set by the bodybuilder before the bodybuilder module BBM is used for logging data. Namely, the bodybuilder module BBM is configured to record the values of selected signals during a first time duration before and/or a during a second time duration after an emergency stop button has been pressed: hence, the first time duration, and/or the second time duration are configurable. The data to be logged is also configurable: the signals, the sample values of which should be recorded, are selected among the signals generated by the plurality of sensors S1, S2, S3 and among the signals generated by the plurality of vehicle integrated sensors VIS1, VIS2, for example GPS position, vehicle speed, engine speed, etc. The source to trigger the bodybuilder module BBM to initiate the data logging process is also configurable; that is to say, the triggering source may be an emergency stop button, but the triggering source may also be anyone of the signals generated by anyone of the sensors or vehicle integrated sensors, provided a predetermined threshold is compared to said triggering source to determine when the data logging process should be initiated.

According to one example, the configuration of the bodybuilder module BBM comprises the electronic control unit ECU of the bodybuilder module BBM being configured to:

- set a first time duration;
- select at least one sensor S1, S2, S3 signal generated by at least one sensor S among the plurality of sensors, and continuously record the at least one sensor S1, S2, S3 signal in the ring buffer memory unit RBM during the first time duration, so that when the ring buffer memory is full new samples from the at least one sensor S1, S2, S3 signal replaces oldest samples from the at least one sensor S1, S2, S3 signal;
- select at least one vehicle integrated sensor VIS1, VIS2 signal generated by at least one vehicle integrated sensor VIS1, VIS2 among the plurality of vehicle integrated sensors, and continuously record samples of the at least one vehicle integrated sensor VIS1, VIS2 signal in the ring buffer memory unit RBM during the first time duration, so that when the ring buffer memory is full, new samples from the at least one vehicle integrated sensor VIS1, VIS2 signal replaces oldest samples from the at least one vehicle integrated sensor VIS1, VIS2 signal;

receive as input a triggering signal related to an incident occurrence, so that a moment of triggering is defined by comparing a triggering signal value at the moment of triggering and a triggering signal threshold;

at the moment of triggering, transfer a content of the ring buffer memory into the recording unit RU.

According to the above example, the sample values of the at least one sensor S1, S2, S3 signal, and the sample values of the at least one vehicle integrated sensor VIS1, VIS2 signal will have been recorded in the ring buffer memory during the first time duration immediately before the moment of triggering, and transferred to the recording unit RU at the moment of triggering.

This logged data may then be transferred to a server, for example in the "cloud". This data may be processed on the bodybuilder module BBM, or on the server, for investigating the reasons and possible consequences of the incident occurrence.

The triggering signal may be one of an emergency stop button, a triggering sensor S1, S2, S3 signal selected among the signals generated by one sensor S1, S2, S3 among the plurality of sensors, a triggering vehicle integrated sensor VIS1, VIS2 signal selected among the signals generated by one vehicle integrated sensor VIS1, VIS2 among the plurality of vehicle integrated sensors.

The plurality of sensors comprise at least one of a temperature sensor for a hydraulic pump, a pressure sensor for a mechanical equipment, an engine speed of an external equipment, a status of an external equipment.

The plurality of vehicle integrated sensors comprise at least one of a vehicle positioning sensor, a vehicle engine speed sensor, a vehicle speed sensor.

Samples from the at least one sensor S1, S2, S3 signal and from the at least one vehicle integrated sensor VIS1, VIS2 signal are recorded at a sampling rate, the sampling rate being one of 0.5 sec, 1 sec, 2 sec, 5 sec, 10 sec, 20 sec, 30 sec, 60 sec.

Preferably, samples recorded are time-stamped; that is to say that a time of occurrence of the signal sample is recorded, and associated to the value of the recorded sample.

The first time duration is determined so that a first number of samples from the at least one sensor S1, S2, S3 signal and from the at least one vehicle integrated sensor VIS1, VIS2 signal are recorded at the sampling rate during the first time duration, the first number of samples being typically comprised between 10 and 30, including 10 and 30, or preferably equal to 20.

According to another example, the configuration of the bodybuilder module BBM comprises the electronic control unit ECU of the bodybuilder module BBM being further configured to:

set a second time duration;

starting at the moment of triggering and during the second time duration, further record in the recording unit RU other new samples from the at least one sensor S1, S2, S3 signal and from the at least one vehicle integrated sensor VIS1, VIS2 signal, at an end of the second time duration, starting at the moment of triggering, save in a saving memory SM of the bodybuilder BBM one or more of the samples recorded in the recording unit RU.

According to this last example, the logged data saved in the saving memory SM may then be transferred to a server, for example in the "cloud". This logged data may be processed on the bodybuilder module BBM, or on the server, for investigating more completely the reasons and possible consequences of the incident occurrence.

According to this example, the second time duration is determined so that a second number of samples from the at least one sensor S1, S2, S3 signal and from the at least one vehicle integrated sensor VIS1, VIS2 signal are recorded at the sampling rate during the second time duration, the second number of samples being typically comprised between 10 and 30, including 10 and 30, or preferably equal to 20. The first number of samples and the second number of samples may or may not be equal.

According to an aspect, the disclosure relates to a vehicle comprising the bodybuilder module (BBM) according to any of the above examples.

FIG. 2 is an exemplary flowchart of the method 200 implemented by the bodybuilder module BBM according to one example. The method 200 implemented by the electronic control unit ECU comprises:

set 300 a first time duration;

select 301 at least one sensor S1, S2, S3 signal generated by at least one sensor S1, S2, S3 among the plurality of sensors;

continuously record 302 samples of the at least one sensor S1, S2, S3 signal in the ring buffer memory unit RBM during the first time duration, so that when the ring buffer memory RBM is full, new samples from the at least one sensor S1, S2, S3 signal replaces oldest samples from the at least one sensor S1, S2, S3 signal;

select 301*bis* at least one vehicle integrated sensor VIS1, VIS2 signal generated by at least one vehicle integrated sensor VIS1, VIS2 among the plurality of vehicle integrated sensors;

continuously record 302*bis* samples of the at least one vehicle integrated sensor VIS1, VIS2 signal in the ring buffer memory unit RBM during the first time duration, so that when the ring buffer memory is full, new samples from the at least one vehicle integrated sensor VIS1, VIS2 signal replaces oldest samples from the at least one vehicle integrated sensor VIS1, VIS2 signal;

determine 303 a triggering signal and a triggering signal threshold related to an incident occurrence, so that a moment of triggering is defined by comparing a triggering signal value at the moment of triggering and the triggering signal threshold, at the moment of triggering, transfer 304 a content of the ring buffer memory RBM into the recording unit RU.

According to the above example, the sample values of the at least one sensor S1, S2, S3 signal, and the sample values of the at least one vehicle integrated sensor VIS1, VIS2 signal will have been recorded in the ring buffer memory during the first time duration immediately before the moment of triggering, and transferred to the recording unit RU at the moment of triggering.

This logged data may then be transferred to a server, for example in the "cloud". This data may be processed on the bodybuilder module BBM, or on the server, for investigating the reasons and possible consequences of the incident occurrence.

According to this implementation example of the method 200, the method 200 may further comprise processing 307 the content of the ring buffer memory RBM transferred into the recording unit RU to determine the causes and consequences of the incident occurrence.

According to a more complete example, the method 200 further comprises:

set 300*bis* a second time duration;

starting at the moment of triggering and during the second time duration, further record 305 in the recording unit RU other new samples from the at least one sensor S1, S2, S3 signal and from the at least one vehicle integrated sensor VIS1, VIS2 signal, at an end of the second time duration, starting at the moment of triggering, save 306 in a saving memory SM of the bodybuilder module BBM one or more of the samples recorded in the recording unit RU.

According to this more complete implementation example of the method 200, the method 200 may further comprise processing 307 the samples saved, to determine more precisely the causes and consequences of the incident occurrence.

FIG. 3 is a schematic diagram of an exemplary electronic control unit ECU for implementing examples disclosed herein; according to one example, the electronic control unit ECU comprises a computer system 100. The computer system 100 is adapted to execute instructions from a computer-readable medium to perform these and/or any of the functions or processing described herein. The computer system 100 may be connected (e.g., networked) to other machines in a LAN, an intranet, an extranet, or the Internet. While only a single device is illustrated, the computer system 100 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit ECU, processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 100 may comprise at least one computing device or electronic device capable of including firmware, hardware, and/or executing software instructions to implement the functionality described herein. The computer system 100 may include a processor device 102 (may also be referred to as a control unit), a memory 104, and a system bus 106. The computer system 100 may include at least one computing device having the processor device 102. The system bus 106 provides an interface for system components including, but not limited to, the memory 104 and the processor device 102. The processor device 102 may include any number of hardware components for conducting data or signal processing or for executing computer code stored in memory 104. The processor device 102 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 106 may be any of several types of bus structures that may further interconnect to a memory bus (with or without a memory controller), a peripheral bus, and/or a local bus using any of a variety of bus architectures. The memory 104 may be one or more devices for storing data and/or computer code for completing or facilitating methods described herein. The memory 104 may include database components, object code components, script components, or other types of information structure for supporting the various activities herein. Any distributed or local memory device may be utilized with the systems and methods of this description. The memory 104 may be communicably connected to the processor device 102 (e.g., via a circuit or any other wired, wireless, or network connection) and may include computer code for executing one or more processes described herein. The memory 104 may include non-volatile memory 108 (e.g., read-only memory (ROM), erasable programmable read-only memory (EPROM), electrically erasable programmable read-only memory (EEPROM), etc.), and volatile memory 110 (e.g., random-access memory (RAM)), or any other medium which can be used to carry or store desired program code in the form of machine-executable instructions or data structures and which can be accessed by a computer or other machine with a processor device 102. A basic input/output system (BIOS) 112 may be stored in the non-volatile memory 108 and can include the basic routines that help to transfer information between elements within the computer system 100.

The computer system 100 may further include or be coupled to a non-transitory computer-readable storage medium such as the storage device 114, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 114 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 114 and/or in the volatile memory 110, which may include an operating system 116 and/or one or more program modules 118. All or a portion of the examples disclosed herein may be implemented as a computer program product 120 stored on a transitory or non-transitory computer-usable or computer-readable storage medium (e.g., single medium or multiple media), such as the storage device 114, which includes complex programming instructions (e.g., complex computer-readable program code) to cause the processor device 102 to carry out the steps described herein. Thus, the computer-readable program code can comprise software instructions for implementing the functionality of the examples described herein when executed by the processor device 102. The processor device 102 may serve as a controller or control system for the computer system 100 that is to implement the functionality described herein.

The computer system 100 also may include an input device interface 122 (e.g., input device interface and/or output device interface). The input device interface 122 may be configured to receive input and selections to be communicated to the computer system 100 when executing instructions, such as from a keyboard, mouse, touch-sensitive surface, etc. Such input devices may be connected to the processor device 102 through the input device interface 122 coupled to the system bus 106 but can be connected through other interfaces such as a parallel port, an Institute of Electrical and Electronic Engineers (IEEE) 1394 serial port, a Universal Serial Bus (USB) port, an IR interface, and the like. The computer system 100 may include an output device interface 124 configured to forward output, such as to a display, a video display unit (e.g., a liquid crystal display (LCD) or a cathode ray tube (CRT)). The computer system 100 may also include a communications interface 126 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

According to an aspect of the disclosure, the disclosure further relates to a computer program product comprising program code for performing the method of any of the exemplary implementations described herein above, when executed by a processor device 102 of an electronic control unit ECU of a bodybuilder module BBM, the electronic control unit ECU controlling a ring buffer memory unit RBM and a recording unit RU.

According to another aspect of the disclosure, the disclosure further relates to a non-transitory computer-readable storage medium comprising instructions, which when executed by a processor device 102 of an electronic control unit ECU of a bodybuilder module BBM, the electronic control unit ECU controlling a ring buffer memory unit RBM and a recording unit RU, cause the electronic control unit ECU to perform the method of any of the exemplary implementations described herein above.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A computer system for data logging, the computer system comprising an electronic control unit configured to:

continuously record bodywork samples from at least one bodywork sensor installed on a bodywork of a vehicle in a ring buffer during a first time duration, so that when the ring buffer is full, new bodywork samples from the at least one bodywork sensor replace oldest bodywork samples from the at least one bodywork sensor, the at least one bodywork sensor comprising at least one of a temperature sensor for a hydraulic pump, a pressure sensor for a mechanical equipment, an engine speed sensor for an external equipment, and a status sensor for the external equipment;

continuously record vehicle samples from at least one vehicle installed on the vehicle in the ring buffer during the first time duration, so that when the ring buffer is full, new vehicle samples from the at least one vehicle sensor replace oldest vehicle samples from the at least one vehicle sensor;

receive a trigger related to an incident occurrence, so that a trigger moment is defined by comparing a trigger value at the trigger moment and a trigger threshold; and at the trigger moment, transfer the bodywork samples and the vehicle samples of the ring buffer into a recording unit to log data about the bodywork and the vehicle at the trigger moment.

2. The computer system of claim 1, wherein the electronic control unit of the computer system is further configured to:

set a second time duration;

starting at the trigger moment and during the second time duration, further record in the recording unit other new bodywork samples or other new vehicle samples from the at least one bodywork sensor or from the at least one vehicle sensor; and at an end of the second time duration, starting at the trigger moment, save in a saving memory of the computer system at least one of the samples recorded in the recording unit.

3. The computer system of claim 1, wherein the computer system is further configured to process at least one of the bodywork samples or the vehicle samples saved to determine the causes and consequences of the incident occurrence.

4. The computer system of claim 1, wherein the trigger threshold is generated by one of an emergency stop button, a triggering sensor selected among the bodywork sensors or the vehicle sensors, and a triggering vehicle sensor selected among the plurality of vehicle sensors.

5. The computer system of claim 1, wherein samples from the at least one bodywork sensor, respectively from the at least one vehicle sensor, are recorded at a first sampling rate, respectively at a second sampling rate, the first sampling rate, respectively the second sampling rate, being one of 0.5 seconds, 1 seconds, 2 seconds, 5 seconds, 10 seconds, 20 seconds, 30 seconds, or 60 seconds.

6. The computer system of claim 5, wherein the first time duration, respectively the second time duration, are determined so that a first number of samples, respectively a second number of samples, from the at least one bodywork sensor and from the at least one vehicle sensor are recorded at the first sampling rate during the first time duration, respectively at the second sampling rate during the second time duration.

7. The computer system of claim 6, wherein the first number of samples, respectively the second number of samples, is comprised between 10 and 30, including 10 and 30.

8. The computer system of claim 1, wherein the vehicle sensors comprises at least one of a vehicle positioning sensor, a vehicle engine speed sensor, and a vehicle speed sensor.

9. A vehicle comprising the computer system of claim 1.

10. A method for logging data on a computer system, comprising:

continuously recording, by an electronic control unit, bodywork samples from at least one bodywork sensor installed on a bodywork of a vehicle in a ring buffer during a first time duration, so that when the ring buffer is full, new bodywork samples from the at least one bodywork sensor replace oldest bodywork samples from the at least one bodywork sensor, the at least one bodywork sensor comprising at least one of a temperature sensor for a hydraulic pump, a pressure sensor for a mechanical equipment, an engine speed sensor for an external equipment, and a status sensor for the external equipment;

continuously recording, by the electronic control unit, vehicle samples from at least one vehicle sensor in the ring buffer during the first time duration, so that when the ring buffer is full, new vehicle samples from the at least one vehicle sensor replace oldest vehicle samples from the at least one vehicle sensor;

determining, by the electronic control unit, a trigger and a trigger threshold related to an incident occurrence, so that a trigger moment of is defined by comparing a trigger value at the trigger moment and the trigger threshold; and at the trigger moment, transferring, by the electronic control unit, the bodywork samples and the vehicle samples of the ring buffer into a recording unit to log data about the bodywork and the vehicle at the trigger moment.

11. The method of claim 10, further comprising:

setting a second time duration;

starting at the trigger moment and during the second time duration, further record in the record unit other new samples from the at least one bodywork sensor and from the at least one vehicle sensor; and at an end of the second time duration, starting at the trigger moment, saving in a saving memory of the computer system at least one of the bodywork samples or the vehicle samples recorded in the recording unit.

12. A computer program product comprising program code for performing the method of claim 10, when executed by a processor device of an electronic control unit of a computer system, the electronic control unit controlling a ring buffer and a recording unit.

13. A non-transitory computer-readable storage medium comprising instructions, which when executed by a processor device of an electronic control unit of a computer system, the electronic control unit controlling a ring buffer and a recording unit, cause the electronic control unit to perform the method of claim 10.

* * * * *